US006441117B1

(12) United States Patent
Cameron

(10) Patent No.: US 6,441,117 B1
(45) Date of Patent: Aug. 27, 2002

(54) HIGH DENSITY POLYETHYLENE PACKAGING

(75) Inventor: John McNally Cameron, Hawkestone (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 49 days.

(21) Appl. No.: 09/650,607

(22) Filed: Aug. 30, 2000

Related U.S. Application Data

(60) Provisional application No. 60/151,916, filed on Sep. 1, 1999.

(51) Int. Cl.[7] .............................. C08F 10/02; C08F 4/44; C08F 110/02
(52) U.S. Cl. ...................... 526/352; 526/161; 526/172; 526/171
(58) Field of Search ................................. 526/172, 161, 526/352; 73/40; 340/605; 220/461, 449, 469, 85 B; 156/289, 160, 190

(56) References Cited

U.S. PATENT DOCUMENTS 5,955,555 A * 9/1999 Bennett ................... 526/133
6,019,348 A 2/2000 Powell

FOREIGN PATENT DOCUMENTS

| DE | 3913193 A1 | 10/1990 | |
| EP | 0 595 442 A1 | 5/1994 | |
| EP | 0 665 102 A1 | 8/1995 | |
| WO | WO 88/10281 A1 | 12/1988 | |
| WO | WO 99/12981 | 3/1999 | ............. C08F/4/70 |
| WO | WO 99/46302 | 9/1999 | ............. C08F/4/70 |
| WO | WO 99/46303 | 9/1999 | ............. C08F/4/70 |
| WO | WO 99/46304 | 9/1999 | ............. C08F/4/70 |
| WO | WO 99/46308 | 9/1999 | .......... C08F/110/02 |
| WO | WO 00/15646 | 3/2000 | ........... C07F/13/00 |
| WO | WO 00/24788 | 5/2000 | ........... C08F/10/00 |
| WO | WO 00/32641 | 6/2000 | ............. C08F/4/70 |

OTHER PUBLICATIONS

Brooke L. Small, et al., New Iron and Cobalt Catalysts for the Polymerization of Olefins, *Am. Chem. Soc.*, 39, 213, 1998.

Britovsek, et al., Novel Olefin Polymerization Catalysts Based on Iron and Cobalt, *J. Chem. Soc. Chem. Commun.*, 849–850, 1998.

* cited by examiner

*Primary Examiner*—David W. Wu
*Assistant Examiner*—R. Harlan

(57) ABSTRACT

High density polyethylene made using a cobalt or iron complex of a selected tridentate ligand as a polymerization catalyst may be made into packaging which has advantageous properties, especially lower permeation to ambient materials such as oxygen and/or water. The packaging, such as bottles, bags and rigid storage tanks, may be formed by conventional methods.

5 Claims, No Drawings

HIGH DENSITY POLYETHYLENE PACKAGING

CROSS-REFERENCE TO RELATED APPLICATION

This application claims priority under 35 U.S.C. §119 from U.S. Provisional Application Ser. No. 60/151,916 (filed Sep. 1, 1999), which is incorporated by reference herein as if fully set forth.

FIELD OF THE INVENTION

High density polyethylene (HDPE) made using certain late transition metal containing catalysts has lower water vapor and/or oxygen transmission rates than similar HDPEs made using other polymerization catalysts, thereby making them superior in uses, such as packaging, where lower water vapor and/or oxygen permeation rates are advantageous.

TECHNICAL BACKGROUND

High density polyethylene (HDPE) is an important commercial product, large quantities being produced worldwide. HDPE is typically recognized (and is defined for the purposes of the present invention) as a substantially linear, semi-crystalline, polymer of ethylene (preferably a homopolymer but also on occasion containing very minor amounts of other well-known comonomers), possessing a density of 0.94 g/mL or higher.

An important use of HDPE is in packaging, which may be divided into two general types—rigid packaging such as bottles and tanks, and flexible packaging such as bags and pouches. The former may be formed by such methods as blow or injection molding, and the latter are usually formed from films having one or more layers, at least one of which is HDPE.

HDPE is a favored packaging material for many products because of low cost, relatively easy formability and good toughness, and for some products having low permeation rates for certain materials either deleterious to these products, or to keep the package's contents from diffusing from the package and being lost, such as water and/or oxygen. Among the types of products where these low permeation rates are important are foods, both dry and liquid materials, and lubricating oils. For example for dry foods low water vapor transmission rates are important to keep the foods crisp, while low oxygen transmission rates are important for any foods that may oxidize, forming off colors and/or tastes or smells in the food. The lower the transmission rates of the packaging, the better the food will taste and/or look, and/or the longer the food may be stored before being used, and/or the thickness of the packaging may be reduced without deleteriously affecting absolute rates of transmission, all of course important advantages. In some instances, such as bottles for toiletries such as perfume or cologne, it may be desirable to keep water in and/or oxygen out. Other combinations will be obvious to the artisan.

U.S. Pat. No. 5,955,555, WO99/12981, WO99/46302, WO99/46303, WO99/46304, WO99/46308, WO99/62963 (corresponding to U.S. patent application Ser. No. 09/317, 104, filed May 21, 1999 now U.S. Pat. No. 6,252,022), WO00/15646, WO00/24788, WO00/32641, G. J. P. Britovesk, et al., *J. Chem. Soc., Chem. Commun.*, p. 849–850 (1998), and B. L. Small, et al., *Polym. Prepr. (Am. Chem. Soc., Div. Polym. Chem.)* vol. 39, p. 213 (1998) (all incorporated by reference herein for all purposes as if fully set forth), all report the polymerization of ethylene using iron and cobalt complexes of certain tridentate ligands. No mention is made of the use of the resulting polymers for packaging where improved (lower) water vapor and/or oxygen permeation rates of HPDE are of interest.

SUMMARY OF THE INVENTION

Disclosed herein is a package comprising a high density polyethylene obtainable (and preferably obtained) by polymerizing ethylene in the presence of a polymerization catalyst component which comprises an iron or cobalt complex of a compound of the formula (I)

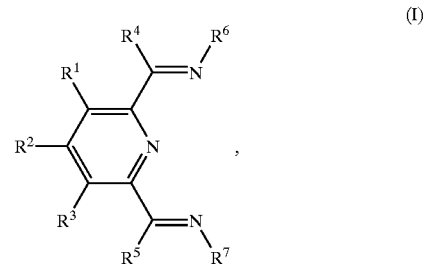

wherein:

$R^1$, $R^2$, $R^3$, $R^4$ and $R^5$ are each independently selected from the group consisting of hydrogen, a hydrocarbyl, an inert functional group and a substituted hydrocarbyl; and $R^6$ and $R^7$ are each independently selected from the group consisting of aryl and substituted aryl.

This invention also concerns a process for making a package, comprising the steps of:

(a) polymerizing ethylene in the presence of a polymerization catalyst component to form high density polyethylene, the polymerization catalyst component comprising an iron or cobalt complex of a compound of the formula

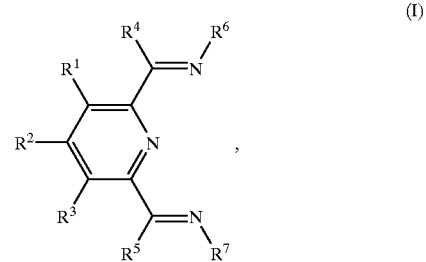

wherein:

$R^1$, $R^2$, $R^3$, $R^4$ and $R^5$ are each independently selected from the group consisting of hydrogen, hydrocarbyl, an inert functional group or substituted hydrocarbyl; and $R^6$ and $R^7$ are aryl or substituted aryl; and (b) forming said polyethylene into said package.

Preferably the package referred to above is a rigid storage tank or is otherwise based upon a multilayer sheet or film containing at least one layer of, or in which at least one of the layers comprises, the HDPE defined above.

This invention further concerns a process for lowering the water vapor and/or oxygen transmission rates of a package manufactured at least in part with a first HDPE, comprising the step of replacing, during the manufacture of said package, at least a portion of the first HDPE with a second HDPE obtainable (and preferably obtained) by polymerizing ethylene in the presence of a polymerization catalyst component which comprises an iron or cobalt complex of a compound of the formula (I)

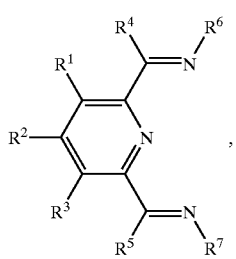

wherein:

$R^1$, $R^2$, $R^3$, $R^4$ and $R^5$ are each independently selected from the group consisting of hydrogen, a hydrocarbyl, an inert functional group and a substituted hydrocarbyl; and $R^6$ and $R^7$ are each independently selected from the group consisting of aryl and substituted aryl.

This invention still further concerns a process for lowering the water vapor and/or oxygen transmission rates of a package manufactured from one or more layers of a first HDPE, comprising the step of replacing, during the manufacture of said package, at least a portion of at least one of the layers of the first HDPE with a layer of a second HDPE obtainable (and preferably obtained) by polymerizing ethylene in the presence of a polymerization catalyst component which comprises an iron or cobalt complex of a compound of the formula (I)

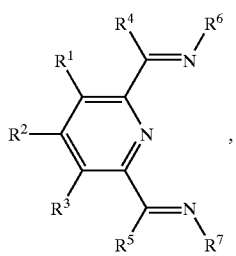

wherein:

$R^1$, $R^2$, $R^3$, $R^4$ and $R^5$ are each independently selected from the group consisting of hydrogen, a hydrocarbyl, an inert functional group and a substituted hydrocarbyl; and $R^6$ and $R^7$ are each independently selected from the group consisting of aryl and substituted aryl.

DETAILED DESCRIPTION OF THE PREFERRED EMBODIMENTS

Herein certain terms are used which are defined below.

A "hydrocarbyl group" is a univalent group containing only carbon and hydrogen. As examples of hydrocarbyls may be mentioned unsubstituted alkyls, cycloalkyls and aryls. If not otherwise stated, it is preferred that hydrocarbyl groups (and alkyl groups) herein contain 1 to about 30 carbon atoms.

By "substituted hydrocarbyl" herein is meant a hydrocarbyl group that contains one or more substituent groups which are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that substituted hydrocarbyl groups herein contain 1 to about 30 carbon atoms. Included in the meaning of "substituted" are rings containing one or more heteroatoms, such as nitrogen, oxygen and/or sulfur. In a substituted hydrocarbyl, all of the hydrogens may be substituted, as in trifluoromethyl.

By "(inert) functional group" herein is meant a group, other than hydrocarbyl or substituted hydrocarbyl, which is inert under the process conditions to which the compound containing the group is subjected. The functional groups also do not substantially deleteriously interfere with any process described herein that the compound in which they are present may take part in. Examples of functional groups include halo (fluoro, chloro, bromo and iodo), and ether such as —$OR^{50}$ wherein $R^{50}$ is hydrocarbyl or substituted hydrocarbyl. In cases in which the functional group may be near a transition metal atom, the functional group alone should not coordinate to the metal atom more strongly than the groups in those compounds that are shown as coordinating to the metal atom, that is they should not displace the desired coordinating group.

By a "cocatalyst" or a "catalyst activator" is meant one or more compounds that react with a transition metal compound to form an activated catalyst species. One such catalyst activator is an "alkyl aluminum compound" which, herein, is meant a compound in which at least one alkyl group is bound to an aluminum atom. Other groups such as, for example, alkoxide, hydride and halogen may also be bound to aluminum atoms in the compound.

By "aryl" is meant a monovalent aromatic group in which the free valence is to the carbon atom of an aromatic ring. An aryl may have one or more aromatic rings which may be fused, connected by single bonds or other groups.

By "substituted aryl" is meant a monovalent aromatic group substituted as set forth in the above definition of "substituted hydrocarbyl". Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

By "relatively noncoordinating" (or "weakly coordinating") anions are meant those anions as are generally referred to in the art in this manner, and the coordinating ability of such anions is known and has been discussed in the literature, see for instance W. Beck., et al., *Chem. Rev.*, vol. 88 p. 1405–1421 (1988), and S. H. Stares, *Chem. Rev.*, vol. 93, p. 927–942 (1993), both of which are hereby included by reference. Among such anions are those formed from aluminum compounds such as those described in the immediately subsequent paragraph and $X^-$, including $(R^{51})_3AlX^-$, $(R^{51})_2AlClX^-$, $R^{51}AlCl_2X^-$, and $R^{51}AlOX^-$, wherein $R^{51}$ is alkyl. Other useful noncoordinating anions include $BAF^-$ {BAF=tetrakis[3,5-bis(trifluoromethyl)phenyl]borate}, $SbF_6^-$, $PF_6^-$, and $BF_4^-$, trifluoromethanesulfonate, p-toluenesulfonate, $(R_fSO_2)_2N^-$, and $(C_6F_6)_4B^-$.

By "neutral Lewis base" is meant a compound, which is not an ion, which can act as a Lewis base. Examples of such compounds include ethers, amines, sulfides, and organic nitriles.

By "cationic Lewis acid" is meant a cation that can act as a Lewis acid. Examples of such cations are sodium and silver cations.

By a "package" is meant any container that is meant to be sealed most of the time (sometimes called "protective packaging"), especially before the contents are used, against ambient conditions such as air and/or moisture, and/or loss of the package's content as by evaporation. The package may be designed so that the seal against ambient conditions may be broken permanently broken as by cutting or tearing to open a sealed bag, or may be broken temporarily, as by opening a screw-cap bottle and then replacing the cap. The package may have one or more inlets and/or outlets to store a material that may be added to and/or withdrawn from the package without further opening the package. The package may be formed in any manner (see below).

The polyethylene used herein is obtainable, and preferably obtained, by polymerizing ethylene in the presence of a catalyst component comprising an iron or cobalt complex of (I).

Such iron and cobalt complexes may be formed by a variety of methods, for example, the complex may be formed before the polymerization is performed, with the preformed complex being added to the polymerization process, or the complex may be formed in situ in the polymerization process, such as disclosed in previously incorporated U.S. Pat. No. 5,955,555 and WO99/12981, or in WO99/50273 (corresponding to U.S. patent application Ser. No. 09/277,910, filed Mar. 29, 1999) and WO00/08034 (also incorporated by reference herein for all purposes as if fully set forth), and reference may be had thereto for further details regarding these catalyst complexes and the preparation thereof.

In preferred embodiments, the catalyst complexes are referred to herein by the formula $(I)MX_n$, wherein (I) is the compound (I), M is selected from the group consisting of Fe and Co, n is 2 or 3, and each X is independently an anion. Preferably each X is independently a halide, and more preferably chloride. This formula can be depicted by the structure (II) below:

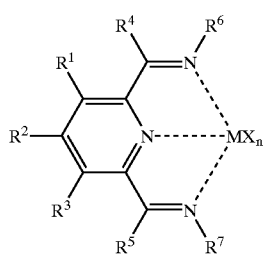

(II)

wherein $R^1$, $R^2$, $R^3$, $R^4$, $R^5$, $R^6$ and $R^7$ are as defined above, and n is 2 or 3.

The following are preferred embodiments of (I):

$R^1$, $R^2$ and $R^3$ are hydrogen; and/or $R^4$ and $R^5$ are each independently selected from the group consisting of hydrogen and methyl, and both are more preferably methyl; and/or $R^6$ and $R^7$ are each independently selected from aryl, and halo-substituted aryl, and more preferably aryl and halo-substituted phenyl, and especially aryl.

In (I) and (II), it is preferred that $R^6$ is

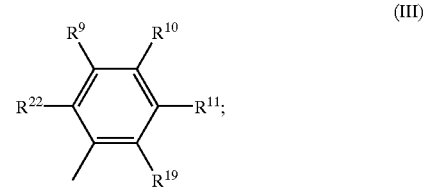

(III)

and $R^7$ is

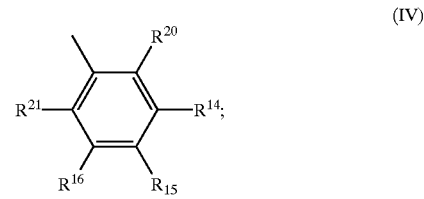

(IV)

wherein:

$R^9$, $R^{10}$, $R^{11}$, $R^{14}$, $R^{15}$, $R^{16}$, $R^{19}$, $R^{20}$, $R^{21}$ and $R^{22}$ are each independently hydrocarbyl, substituted hydrocarbyl or an inert functional group; provided that any two of $R^9$, $R^{10}$, $R^{11}$, $R^{14}$, $R^{15}$, $R^{16}$, $R^{19}$, $R^{20}$, $R^{21}$ and $R^{22}$ vicinal to one another taken together may form a ring.

In particularly preferred embodiments, $R^9$, $R^{11}$, $R^{14}$ and $R^{16}$ are hydrogen; $R^{19}$, $R^{20}$, $R^{21}$ and $R^{22}$ are independently methyl, ethyl, propyl, isopropyl, halo or trihalomethyl; and $R^{10}$ and $R^{15}$ are independently hydrogen, methyl, ethyl, propyl, isopropyl, halo or trihalomethyl.

The compound (I) is preferably formed by contacting a 2,6-diacetylpyridine with an amino-substituted aryl compound under conditions so as to form imine linkages, as disclosed in previously incorporated such as disclosed in previously incorporated U.S. Pat. No. 5,955,555, WO99/12981, WO99/50273 (corresponding to U.S. patent application Ser. No. 09/277,910, filed Mar. 29, 1999 now U.S. Pat. No. 6,232,259 and WO00/08034, and reference may be had thereto for further details.

The polymerization catalyst component may optionally comprise other components such as, for example, co-catalysts and catalyst activators.

For example, the catalyst component may contain a compound W, which is a neutral Lewis acid capable of abstracting an $X^-$ from the catalyst complex to form $WX^-$, provided that the anion formed is a weakly coordinating anion, or a cationic Lewis or Bronsted acid whose counterion is a weakly coordinating anion; and provided that when none of X is alkyl, acyl or hydride, said second compound is capable of transferring hydride or alkyl to M.

Preferred compounds W include alkylaluminum compounds and/or other neutral Lewis bases. For example, the complex (I)MX$_n$ wherein M is Co or Fe, n is 2 or 3, and X is halide, may be contacted with an alkylaluminum compound such as methylaluminoxane to form a highly active polymerization catalyst. Iron complexes are preferred, Fe[II] and Fe[III] complexes are more preferred, and Fe[II] complexes are especially preferred. A particularly preferred complex is [2,6-diacetylpyridinebis{(2,4,6-trimethyl) phenylimine}]iron dichloride, especially in combination with methylaluminoxane.

Additional details may again be found in previously incorporated U.S. Pat. No. 5,955,555 and WO99/12981, or in WO99/50273 (corresponding to U.S. patent application Ser. No. 09/277,910, filed Mar. 29, 1998 now U.S. Pat. No. 6,232,259) and WO00/08034.

The polymerization to form the HDPE used in the present invention may be carried out in the gas phase, or in the liquid phase especially in slurry. In one preferred method the catalyst system, especially the iron or cobalt complex, is supported on a solid (heterogeneous) support, such as silica, alumina, another polymer, or a metal halide. The polymerization may also be carried out in batch, semi-batch, continuous, or continuous polymerizations in series. Continuous polymerizations are preferred.

Useful and preferred systems and conditions for carrying out the ethylene polymerization are described in, for example, previously incorporated U.S. Pat. No. 5,955,555, WO99/12981, WO99/46302, WO99/46303, WO99/46304, WO99/46308, WO99/62963 (corresponding to U.S. patent application Ser. No. 09/317,104, filed May 21, 1999 now U.S. Pat. No. 6,252,022), WO00/15646, WO00/24788, WO00/32641, and reference may be had thereto for further details.

The package may be formed by any conventional method for forming packages from thermoplastics. For rigid containers such as bottles, sealable cartons, storage tanks especially for water, chemicals, fuels and solvents, cosmetic jars, barrels, and drums, the container may be blow molded or rotomolded. In extrusion blow molding for example the body of the container such as a bottle may just be the HDPE described herein, or may contain two or more layers, at least one of which is the HDPE described herein. The cap of a screw-cap or snap-cap bottle be made of the HDPE, as by injection molding, or thermoforming, or may be made of another material, such as another thermoplastic, a thermoseting resin, metal, etc., as appropriate. Two halves (or other fractional parts) of the container may be thermoformed from a sheet of the HDPE or a multilayer sheet containing at least one layer of the HDPE, and the parts joined by welding or by an adhesive or both.

Another form of packaging is flexible bags or pouches, many of which are heat sealed or sealed with adhesive after being filled with whatever they are to contain. These may be made from films or tubes of the HDPE, or multilayer films or tubes that contain at least one layer of the HDPE. A tube for example may be heat sealed at one end, filled with liquid or solid, and then heat sealed or sealed with adhesive at the other end. A film may be folded once, heat sealed along the sides, filled, and then heat sealed at the other end, or adhesive may be used for some of all of the seals. Pouches may be formed by similar methods, except they tend to be more rigid, because of the thickness of the material from which they are made and/or their configuration. The flexible packages may also be sealed by interlocking seals that may be opened and resealed, sometimes called zip lip seals.

All of the above types of packages, and other types of packages, may be made by methods known in the art for making packaging from thermoplastics, see for example H. Mark, et al., Ed., *Encyclopedia of Polymer Science and Engineering*, Vol. 10, John Wiley & Sons, New York, 1987, p. 684–720, which is hereby included by reference.

As such, HDPE-containing packaging having improved (lower) water vapor and/or oxygen transmission rates can be prepared by replacing, during the manufacture of the package, at least a portion of the HDPE with a second HDPE obtainable (and preferably obtained) as set forth above.

Replacement can be accomplished by substituting this second HDPE at the time of manufacture of the package. The second HDPE can simply be used in place of conventional HDPE, or can be blended with conventional HDPE in order to replace a portion of the same. For multilayer packaging as described above, one or more of the layers can be prepared solely from the second HDPE, or a blend of the second HDPE with conventional HDPE, then substituted for a layer of conventional HDPE.

The blend can be a standard physical blend, melt blend, or even a reactor blend prepared by polymerizing ethylene in the presence of the catalyst complex referred to above, along with a second active HDPE catalyst (co-catalyst) such as a Ziegler-Natta and/or metallocene-type catalyst known in the art. See, for example, previously incorporated WO99/12981, WO99/46302, WO99/46303, WO99/46304, WO99/46308, WO00/15646, WO00/24788, WO00/32641, as well as WO98/38228 and WO99/50318 (corresponding to U.S. patent application Ser. No. 09/619,509, filed Jul. 19, 2000), which are also incorporated by reference herein for all purposes as if fully set forth.

In the Examples the following tests were used:

Oxygen transmission was measured using an Oxtran® 2/20 Model T, high transmission rate tester (Mocon, Inc., Minneapolis, Minn. 55428 U.S.A.) at 23° C. and 0% relative humidity using 100% oxygen (not air). Sample films were run in duplicate. The theory of the test is outlined in ASTM D3985-81 "Standard test Method for Oxygen Gas Transmission Rate through plastic film and sheeting using coulometric sensor". Results are reported per 25 μm thickness (1 mil). Values were corrected to a barometric pressure of 101 kPa (760 mmHg). Samples were conditioned for 2 h prior to testing. Test area was 100 cm$^2$. Examine time was 60 min. Nitrogen gas flow was 20.1 smLm.

Moisture Vapor Transmission was measured using a Permatran® W 3/31, water vapor transmission system (Mocon, Inc.) at 38° C. and 90–100% RH. Sample films were run in duplicate. The theory of the test is outlined in ASTM D1249-90 "Standard Test Method for Water Vapor Transmission through plastic film and sheeting using a modulated infrared sensor". Results are reported per 25 μm (1 mil) thickness. Sample test area was 50 cm$^2$. Relative Humidity was essentially 100%. Sample was conditioned 2 h before testing. Examine time was 30 min. Test temperature was 37.8° C.

Unless otherwise noted polymer density was measured on samples prepared according to ASTM D1928, Procedure C, slightly modified. Polytetrafluoroethylene coated aluminum foil was used as the parting sheets, and the heatup time was 1.5 min at 180° C., while eliminating the backup sheets and placing the sandwich of material and a 10 mil (250 μm) chase of Teflon® FEP (available from E. I. DuPont de Nemours & Co., Wilmington, Del. 19898) between the two sheets of foil and placing it directly between the press platens. The density measurement was done following ASTM D1505. Density of extruded blown films was measured on the as made films using the method of ASTM D1505.

Melting point and heat of fusion of polymers was measured by differential scanning calorimetry, using values from the 2nd heat, and using a heating rate of 10° C./min. The peak of the melting endotherm was taken as the melting point.

$I_2$ and $I_{10}$, which are melt indices at different shear stresses, were measured by ASTM method D1238.

In the Examples, all pressures are gauge pressures.

In the Examples Mn is number average molecular weight, Mw is weight average molecular weight, both determined by Gel Permeation Chromatography, PD is Mw/Mn, Tm is melting point, and $\Delta H_f$ is heat of fusion.

and finally with anhydrous pentane and dried under vacuum. Inductively Coupled Plasma analysis indicated: Al=6.7%, Fe=0.12%.

In a dry box, small stainless cylinders (25 to 40 mL volume) were charged with supported (II) (150 mg total weight including support) and a solution of triisobutyl aluminium (5 mL of a 1 M solution in hexane, Aldrich). The cylinders were connected to the autoclave reactor ports under nitrogen purge of the connections. Cylinder pressurization lines were also connected under purge.

Isobutane (1200 g, Matheson C.P. grade) was transferred into a cooled autoclave (–30° C.) by pressure difference. Once the transfer was completed, the autoclave [Autoclave Engineers, 1-gal (3.8 L)] was heated to 20° C. and stirred at 1000 rpm. The solvent was saturated with hydrogen to the designated $H_2$ pressure. After saturation, the reactor was heated to 80° C. and pressurized with ethylene to 1.72 MPa. The triisobutyl aluminum solution was pushed into the reactor with ethylene followed by the catalyst also pushed with ethylene. The final reactor pressure was 2.41 MPa and the ethylene feed was switched from the feed vessels to the side port in the autoclave. The reaction was run for more than 2 h or until the weight loss in the ethylene cylinder was equal to approximately 800 g. At the end of the polymerization, the reactor was vented slowly through a 5 h period, followed by a nitrogen purge prior to opening of the reactor. The polymer was dried overnight. Two polymer samples were prepared at different hydrogen pressures, and their as made properties are given below:

| Ex. | $H_2$ Pressure (kPa) | $I_2$ | $I_{10}$ | $I_{10}/I_2$ | Mn | Mw | PD | Density g/mL | Tm ° C. | $\Delta H_f$ J/g |
|---|---|---|---|---|---|---|---|---|---|---|
| 1 | 640 | 1.00 | 15.5 | 15.5 | 10330 | 128267 | 12.4 | 0.9641 | 134.9 | 242 |
| 2 | 690 | 1.53 | 22.8 | 15 | 9545 | 109403 | 11.5 | | | |

EXAMPLE 1

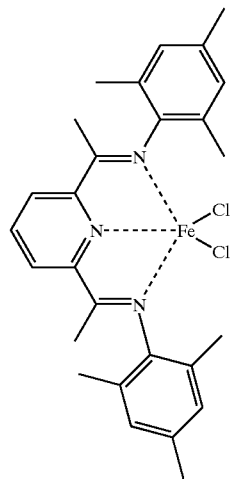

(III)

(III) can be made, for example, by procedures described in previously incorporated U.S. Pat. No. 5,955,555 and WO99/12981. Inside a nitrogen purged drybox, (III) (28.0 mg, purified by recrystallization from $CH_2Cl_2$/pentane) was placed in anhydrous toluene (~10 ml) and MMAO-12 (1.2 g, Akzo-Nobel, 12.25 wt % modified (contains some isobutyl groups) MAO in toluene) was added. The resulting orange solution was shaken for 1 min and then dehydrated silica (1.9 g, Grace-Davison 948 spherical silica) was added and the mixture shaken for 1 h. The orange solid was filtered from the clear solution, washed well with anhydrous toluene

EXAMPLES 3–4

Comparative Examples A–B

The powder polymers from Examples 1 and 2 were each powder blended with 500 ppm of Irganox® 1076 and 500 ppm of Irgafos® 168 antioxidants (made by Ciba-Geigy Corp.).

Alathon® 7820 high density polyethylene was obtained from Equistar Chemicals, L.P., Houston, Tex. 77252 U.S.A.).

Sclair® 19C high density polyethylene was obtained from Nova Chemicals Corp. (Calgary, AB, Canada T2P 5C6), and is believed to have been made in solution using a Ziegler-Natta-type catalyst.

Properties of the polymers used are shown below in Table 1.

TABLE 1

| Polymer | Density, g/mL | $I_2$ | $I_{10}$ | $I_{10}/I_2$ |
|---|---|---|---|---|
| Ex. 1 | | 0.99 | 14.59 | 14.7 |
| Ex. 2 | | 1.88 | 24.89 | 13.2 |
| Alathon ® 7820 | 0.9563 | 0.44 | 8.03 | 18.4 |
| Sclair ® 19C | 0.9523 | 0.97 | 8.85 | 9.13 |

Each polymer was blown into nominally 50 μm (2 mil) thick film [actual thicknesses 44.5–50.8 μm (1.75–2.00 mil)] using a 2.54 cm (1") diameter Killion blown film die fed from a 1.9 cm (¾") diameter Killion 30/1 L/D extruder fitted with a 3/1 compression ratio general purpose screw, 0.46 cm (0.18") deep at the feed end, and included mixing heat. The die gap was 0.11 cm (0.045"). The rear zone of the extruder was at 172–184° C. All other barrel and die temperatures were 220–240° C. The extruder screw speed was 100 rpm. For the film die, blow-up ratio was 3.5:1, and haul off speed was 305–335 cm/min (10–11 ft./min). The frost line was kept at about 12.7–14.0 cm (5.0–5.5 inches) above the die, by adjustment of the blower speed. Properties of the as made films are given in Table 2.

TABLE 2

| Ex. | Polymer | Film Density | mL-mil $O_2$/100 in²/day (nmol/m² · s/25 μm) | g $H_2O$-mil/100 in²/day (μmol/m² · s/25 μm) |
|---|---|---|---|---|
| A | Alathon ® 7820 | 0.949 | 168.2, 167.5 (1346, 1340) | 0.27, 0.27 (2.7, 2.7) |
| B | Sclair ® 19C | 0.947 | 178.3, 184.9 (1426, 1479) | 0.29, 0.28 (2.9, 2.8) |
| 3 | Ex. 1 | 0.955 | 142.4, 143.1 (1139, 1145) | 0.22, 0.22 (2.2, 2.2) |
| 4 | Ex. 2 | 0.956 | 142.5, 116.8 (1140, 934) | 0.19, 0.20 (1.9, 2.0) |

What is claimed is:

1. A rigid storage tank comprising a high density polyethylene obtained by polymerizing ethylene in the presence of a polymerization catalyst component which comprises an iron or cobalt complex of a compound of the formula (I)

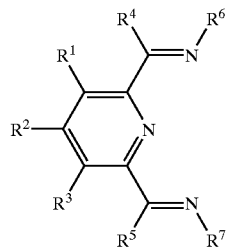

(I)

wherein:
$R^1$, $R^2$, $R^3$, $R^4$ and $R^5$ are each independently selected from the group consisting of hydrogen, a hydrocarbyl, an inert functional group and a substituted hydrocarbyl; and $R^6$ and $R^7$ are each independently selected from the group consisting of aryl and substituted aryl.

2. The rigid storage tank as recited in claim 1 wherein said complex is [2,6-diacetylpyridinebis{(2,4,6-trimethyl) phenylimine}]iron dichloride.

3. The rigid storage tank as recited in claim 1, characterized in that said high density polyethylene is obtained by polymerizing ethylene in the presence of said polymerization catalyst component.

4. A process for making a rigid storage tank, comprising the steps of:

(a) polymerizing ethylene in the presence of a polymerization catalyst component to form high density polyethylene, the polymerization catalyst component comprising an iron or cobalt complex of a compound of the formula

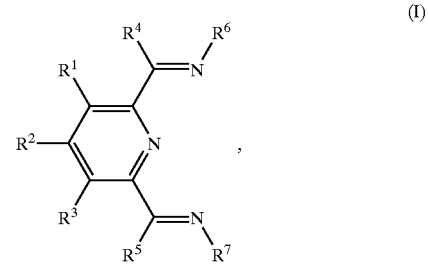

(I)

wherein:

$R^1$, $R^2$, $R^3$, $R^4$ and $R^5$ are each independently selected from the group consisting of hydrogen, hydrocarbyl, an inert functional group or substituted hydrocarbyl; and $R^6$ and $R^7$ are aryl or substituted aryl;

(b) forming said high density polyethylene into said rigid storage tank.

5. The process as recited in claim 4 wherein said complex is [2,6-diacetylpyridinebis{(2,4,6-trimethyl)-phenylimine}] iron dichloride.

* * * * *